United States Patent
Tsirkin et al.

(10) Patent No.: US 11,449,434 B2
(45) Date of Patent: Sep. 20, 2022

(54) REVERSE SHADOW PAGE TABLES FOR FIREWALLED NESTED ENCRYPTED VIRTUAL MACHINES

(71) Applicant: Red Hat, Inc., Raleigh, NC (US)

(72) Inventors: Michael Tsirkin, Lexington, MA (US); Andrea Arcangeli, Imola (IT)

(73) Assignee: Red Hat, Inc., Raleigh, NC (US)

( * ) Notice: Subject to any disclaimer, the term of this patent is extended or adjusted under 35 U.S.C. 154(b) by 330 days.

(21) Appl. No.: 16/846,612

(22) Filed: Apr. 13, 2020

(65) Prior Publication Data

US 2021/0318962 A1    Oct. 14, 2021

(51) Int. Cl.
| | | |
|---|---|---|
| *G06F 12/1009* | (2016.01) | |
| *G06F 12/0882* | (2016.01) | |
| *G06F 12/14* | (2006.01) | |
| *G06F 9/455* | (2018.01) | |

(52) U.S. Cl.
CPC ...... *G06F 12/1009* (2013.01); *G06F 9/45558* (2013.01); *G06F 12/0882* (2013.01); *G06F 12/1408* (2013.01); *G06F 2009/45583* (2013.01); *G06F 2009/45587* (2013.01); *G06F 2212/7201* (2013.01)

(58) Field of Classification Search
CPC ............ G06F 12/1408; G06F 12/0882; G06F 12/109; G06F 12/1491; G06F 9/45558; G06F 12/1009; G06F 2212/657; G06F 2009/45566; G06F 2212/1052; G06F 2212/1016; G06F 2009/45587; G06F 2212/151; G06F 2009/45583; G06F 2212/651; G06F 2212/7201

USPC .......................................................... 711/6
See application file for complete search history.

(56) References Cited

U.S. PATENT DOCUMENTS

| | | | |
|---|---|---|---|
| 10,296,465 B2 | 5/2019 | John et al. | |
| 10,437,627 B2 | 10/2019 | Hu et al. | |
| 2018/0060107 A1* | 3/2018 | Hu ..................... | G06F 9/45558 |
| 2018/0329638 A1* | 11/2018 | Tsirkin .................... | G06F 3/065 |

(Continued)

OTHER PUBLICATIONS

Gandhi et al., "Agile Paging: Exceeding the Best of Nested and Shadow Paging", 12 pages, https://research.cs.wisc.edu/multifacet/papers/isca16_agile_paging.pdf.

(Continued)

*Primary Examiner* — Hashem Farrokh
(74) *Attorney, Agent, or Firm* — Lowenstein Sandler LLP

(57) ABSTRACT

Systems and methods for memory management for virtual machines. An example method may comprise running, by a host computer system, a Level 0 hypervisor managing a Level 1 virtual machine running a Level 1 hypervisor which manages a Level 2 virtual machine having encrypted memory pages. The Level 1 hypervisor may generate a shadow page table where each shadow page table entry of the plurality of shadow page table entries maps a Level 2 guest virtual address of a Level 2 address space associated with the Level 2 virtual machine to a corresponding Level 1 guest physical address of a Level 1 address space associated with the Level 1 virtual machine. The Level 0 hypervisor may generate a Level 0 page table comprising a plurality of Level 0 page table entries that maps a Level 1 guest physical address to a corresponding Level 0 host physical address.

20 Claims, 7 Drawing Sheets

(56) References Cited

U.S. PATENT DOCUMENTS

2019/0108051 A1    4/2019  Wang et al.
2020/0167085 A1*   5/2020  Werner ................. G06F 3/0631

OTHER PUBLICATIONS

Gandhi et al., "Efficient Memory Virtualization", 12 pages, http://pages.cs.wisc.edu/~swift/papers/micro14-virtualization.pdf.
Alkassar et al., "Verifying Shadow Page Table Algorithms", Jan. 2010, 5 pages, https://www.researchgate.net/publication/220884505_Verifying_shadow_page_table_algorithms/link/56a2d1cc08aeef24c585fd3b/download.
Xia et al., "Architecture Support for Guest-Transparent VM Protection from Untrusted Hypervisor and Physical Attacks", IEEE 2013, 12 pages, http://class.ece.iastate.edu/tyagi/cpre581/papers/HPCA13VMProtection.pdf.

* cited by examiner

REVERSE SHADOW PAGE TABLES FOR FIREWALLED NESTED ENCRYPTED VIRTUAL MACHINES

TECHNICAL FIELD

The present disclosure is generally related to virtualized computer systems, and more particularly, to reverse shadow page tables for firewalled nested encrypted virtual machines.

BACKGROUND

Virtualization herein shall refer to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device and input/output (I/O) virtualization involves managing the routing of I/O requests between virtual devices and the shared physical hardware.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
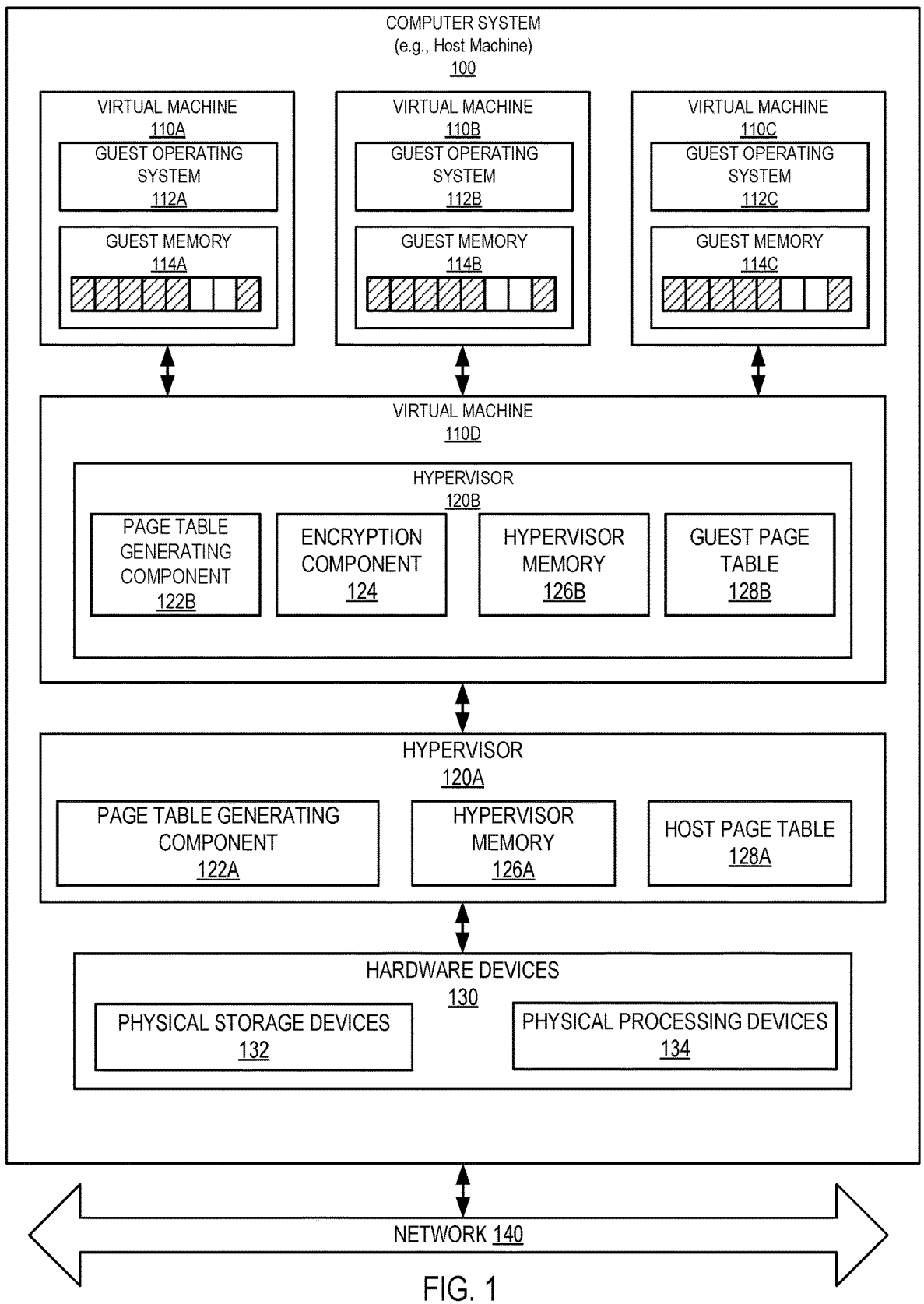
FIG. 1 depicts a high-level block diagram of an example host computer system that performs hypervisor memory management for virtual machines, in accordance with one or more aspects of the present disclosure.

Described herein are systems and methods for reverse shadow page tables for firewalled nested encrypted virtual machines.

Nested virtualization refers to virtualization that runs inside an already virtualized environment. In nested virtualization, a first hypervisor (hereafter "Level 0 hypervisor" or "level 0 hypervisor") controls physical hardware resources (e.g., bare metal). One or more second hypervisors (hereafter "Level 1 hypervisor" or "level 1 hypervisor") may run as virtual machine(s) managed by the Level 0 hypervisor. Each L1 hypervisor may run its own set of VMs. These VMs can be referred to as Level 2 VMs. Each level indicates a ring of privilege and access to computing resources of a computer system, where Level 0 indicates a most privileged ring within an architecture of the computer system, and incremental levels indicate less privileged rings (e.g., Level 2 is less privileged that Level 1). The Level 1 hypervisor may control execution of the Level 2 guest VM(s). For example, the Level 1 hypervisor may implement a firewall in software and prevent the Level 2 guest VM from communicating outside the Level 1 hypervisor.

Modern computer systems have begun using trusted execution environments (TEEs) to enhance the isolation of data of a computing process from other processes executing on the computer system. A trusted execution environment may use hardware based encryption to encrypt the data of a lower privileged process so that higher privileged computing processes do not have access to the data in an unencrypted form. This enables a lower privileged process to isolate its data from the higher privileged processes even though the higher privileged processes may be responsible for managing the data. In one example, one or more TEEs may be implemented using Software Guard eXtensions® (SGX) provided by Intel®, Memory Encryption Technology provided by AMD® (e.g., Secure Encrypted Virtualization® (SEV), Secure Memory Encryption (SME, SME-ES), TrustZone® provided by ARM®, other technology, or a combination thereof.

Encrypted VM memory is a technology supported by TEEs, in which guest memory of the VM is protected from the hypervisor by means of encryption. Typically, not all of the guest memory needs to be encrypted, so the guest VM can control which memory is encrypted by means of marking memory as unencrypted or encrypted in guest controlled guest page tables, which can be used by a virtual central processing unit (vCPU) for translation of guest virtual addresses to guest physical addresses. The guest physical addresses may then be translated to host physical addresses. This creates a limited form of TEE, which ensures that most of the guest memory is protected against attacks such as a cold boot, or against a vulnerable (but not a malicious) hypervisor.

However, current technologies do not allow encrypted VM memory to be supported together with nested virtualization, since in nested visualization, a Level 2 guest VM is ultimately controller by the Level 0 hypervisor (e.g., on the bare metal hardware). The Level 0 hypervisor normally analyzes its own page table (hereafter "Level 0 page table") and a page table of the Level 1 hypervisor (hereafter "Level 1 page table"). The Level 0 hypervisor may then generate a combined Level 0-Level 1 page table, which translates Level 2 guest physical addresses to Level 0 host physical addresses. This may be referred to as shadowing, and the Level 0-Level 1 page table may be a shadow page table. Further, a Level 2 guest page table may be used to translate guest virtual addresses of the Level 2 VM to guest physical addresses. Thus, to translate a Level 2 virtual address to a host physical address, the computer system uses the Level 2 guest page table (which translates Level 2 guest virtual addresses to Level 2 guest physical addresses) and the Level 0-Level 1 shadow page table (which translates Level 2 guest physical addresses to Level 0 host physical addresses). Such a configuration allows a malicious Level 2 guest VM to mark a section of memory as non-encrypted and make it accessible to malicious attacks (such as a cold boot), since the non-encrypted memory is generally accessible to the Level 0 hypervisor, thus bypassing efforts by the Level 1 hypervisor to limit the Level 2 guest VM by means of a software firewall.

Aspects of the present disclosure address the above and other deficiencies by providing technology that can support nested virtualization with encrypted memory. In particular, aspects of the present disclosure provide a shadow page table configuration which effectively allows encrypting all Level 2 memory by reversing the order of shadow page tables. In an illustrative example, a host computer system runs a Level 0 hypervisor managing a Level 1 virtual machine running a Level 1 hypervisor. The Level 1 hypervisor may manage one or more Level 2 virtual machines having all their respective memory pages encrypted. The Level 1 hypervisor may detect that it is running in an encrypted memory virtual machine. For example, the Level 1 virtual machine running the Level 1 hypervisor may be an encrypted memory virtual machine. The Level 1 hypervisor may then generate a shadow page table having shadow page table entries by using a Level 2 page table and a Level 1 page table. For example, the Level 2 page table may translate Level 2 guest virtual addresses to Level 2 guest physical addresses and the Level 1 page table may translate Level 2 guest physical addresses to Level 1 guest physical addresses. Thus, each shadow page table entry may map a Level 2 guest virtual address of a Level 2 address space to a corresponding Level 1 guest physical address of a Level 1 address space. Further, the Level 0 hypervisor may generate a Level 0 page table having Level 0 page table entries. Each Level 0 page table entry may maps a Level 1 guest physical address to a corresponding Level 0 host physical address. Thus, the host computer system may translate Level 2 guest virtual addresses to Level 0 host physical addresses by, for example, having the Level 1 hypervisor cause a virtual central processing unit (vCPU) of the Level 2 virtual machine use the shadow page table for address translation, and then the Level 0 hypervisor cause a central processing unit (CPU) of the host computer system to use the Level 0 page table for address translation. By maintaining the shadow page table in the Level 1 hypervisor, the memory pages of the Level 2 virtual machine remain encrypted during an attack. Accordingly, aspects of the present disclosure protect nested virtualization system using encrypted memory from malicious or vulnerable guest VMs.

Various aspects of the above referenced methods and systems are described in details herein below by way of examples, rather than by way of limitation. The examples provided below discuss a virtualized computer system where memory movement may be initiated by aspects of a hypervisor, a host operating system, a virtual machine, or a combination thereof. In other examples, the memory movement may be performed in a non-virtualized computer system that is absent a hypervisor or other virtualization features discussed below.

FIG. 1 depicts an illustrative architecture of elements of a computer system 100, in accordance with an embodiment of the present disclosure. It should be noted that other architectures for computer system 100 are possible, and that the implementation of a computing device utilizing embodiments of the disclosure are not necessarily limited to the specific architecture depicted. Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computing device 100 may be a computing device implemented with x86 hardware. In another example, computing device 100 may be a computing device implemented with PowerPC®, SPARC®, or other hardware. In the example shown in FIG. 1, computing device 100 may include virtual machines 110A-C, hypervisors 120A-B, hardware devices 130, and a network 140.

Virtual machines 110A-D may execute guest executable code that uses an underlying emulation of the physical resources. The guest executable code may include a guest operating system, guest applications, guest device drivers, etc. Each of the virtual machines 110A-D may support hardware emulation, full virtualization, para-virtualization, operating system-level virtualization, or a combination thereof. Virtual machines 110A-C may have the same or different types of guest operating systems, such as Microsoft®, Windows®, Linux®, Solaris®, etc. Virtual machines 110A-C may execute guest operating systems 112A-D that manage guest memory 114A-C respectively. Virtual machine 110D may also execute a guest operating system that manages guest memory. Virtual machine 110D be the same or similar in all aspects to virtual machines 110A-C.

Guest memory 114A-C may be any virtual memory, logical memory, physical memory, other portion of memory, or a combination thereof for storing, organizing, or accessing data. Guest memory 114A-C may represent the portion of memory that is designated by hypervisors 120A-B for use by one or more respective virtual machines 110A-C. Guest memory 114A-C may be managed by guest operating system 112A-C and may be segmented into guest pages. The guest pages may each include a contiguous or non-contiguous sequence of bytes or bits and may have a page size that is the same or different from a memory page size used by hypervisor 120. Each of the guest page sizes may be a fixed-size, such as a particular integer value (e.g., 4 KB, 2 MB) or may be a variable-size that varies within a range of integer values.

Hypervisor memory 126A (e.g., host memory) and hypervisor memory 126B (e.g., guest memory) may be the same or similar to the guest memory but may be managed by hypervisor 120A-B, respectively, instead of a guest operating system. Hypervisor memory 126A may be segmented into host pages, and hypervisor memory 126B may be segmented into guest pages, which may be in different states. The states may correspond to unallocated memory, memory allocated to guests, and memory allocated to hypervisor(s). The unallocated memory may be host memory pages and guest memory pages that have not yet been allocated by hypervisor memory 126A-B or were previously allocated by hypervisor 120A-B and have since been deallocated (e.g., freed) by hypervisor 120A-B. The memory allocated to guests may be a portion of hypervisor memory 126A that has been allocated by hypervisor 120A to virtual machine 110D and corresponds to guest memory of virtual machine 114D, and to guest memory of hypervisor 120B, which is running on virtual machine 110D. Hypervisor 120B may allocate a portion of hypervisor memory 126B to virtual machines 110A-C, which corresponds to guest memory 114A-C. Other portions of hypervisor memory may be allocated for use by hypervisor 120A-B, a host operating system, hardware device, other module, or a combination thereof.

Hypervisor 120A may also be known as a virtual machine monitor (VMM) and may provide hypervisor 120B and virtual machines 110A-D with access to one or more features of the underlying hardware devices 130. Hypervisor 120A may be a Level 0 hypervisor, thus having the highest level of privilege within the computer system 100. In the example shown, hypervisor 120A may run directly on the hardware of computer system 100 (e.g., bare metal hypervisor). In other examples, hypervisor 120A may run on or within a host operating system (not shown). Hypervisor 120A may manage system resources, including access to hardware devices 130. In the example shown, hypervisor 120A may include a page table generating component 122A.

Page table generating component 122A may generate host page table 128A. A page table is a data structure used by a hypervisor to store a mapping of addresses of guest memory to addresses of hypervisor memory. In an example, hypervisor 120A may use the host page table 128A to store a mapping of addresses of the guest memory and of hypervisor memory 126B to addresses of the hypervisor memory 126A. Accordingly, address translation is handled using the page table(s). Host page table 128A may include one or more page tables such as a protected host page table or an unprotected host page table. In an example, host page table 128A may be an extended page table ("EPT"), translating guest physical addresses to host physical addresses (e.g., Level 1 guest physical addresses to Level 0 host physical addresses). In another example, host page table 128A may be a shadow page table translating the guest virtual addresses to host physical addresses (e.g., Level 1 guest virtual addresses to Level 0 host physical addresses).

Guest page table 128B may be the same or similar to the host page table 128A but may be managed by hypervisor 120B, instead of hypervisor 120A. In an example, hypervisor 120B may use the guest page table 128B to store a mapping of addresses of the guest memory 114A-C to addresses of the hypervisor memory 126B. Accordingly, address translation is handled using the page table(s). Guest page table 128B may include one or more page tables such as a protected host page table or an unprotected host page table. In an example, guest page table 128B may be an extended page table ("EPT"), translating guest physical addresses to hypervisor physical addresses (e.g., Level 2 guest physical addresses to Level 1 guest physical addresses). In another example, guest page table 128B may be a shadow page table translating the Level 2 guest virtual addresses to Level 1 guest physical addresses.

Hypervisor 120B may also be known as a virtual machine monitor (VMM) and may provide virtual machines 110A-C with access to one or more features of the underlying hardware devices 130. Hypervisor 120B may be a level 1 (Level 1) hypervisor, thus having a lower privilege than hypervisor 120A. In the example shown, hypervisor 120B may run on or within a virtual machine 110D running on hypervisor 120A. Hypervisor 120B may manage system resources provided to hypervisor 120B by virtual machine 110D or by hypervisor 120A. In the example shown, hypervisor 120B may include a page table generating component 122B and an encryption component 124. Components 122B and 124 may each be separated into one or more components or may be included within the same component.

Page table generating component 122B may be similar or the same as page generating component 122A, and may generate guest page table 128B. Encryption component 124 may mark memory as encrypted or unencrypted in the guest page table 128B. The features of page table generating component 122B and encryption component 124 are discussed in more detail below in regards to FIG. 2.

Hardware devices 130 may provide hardware resources and functionality for performing computing tasks. Hardware devices 130 may include one or more physical storage devices 132, one or more physical processing devices 134, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks. Physical processing devices 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

Network 140 may be a public network (e.g., the internet), a private network (e.g., a local area network (LAN), a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
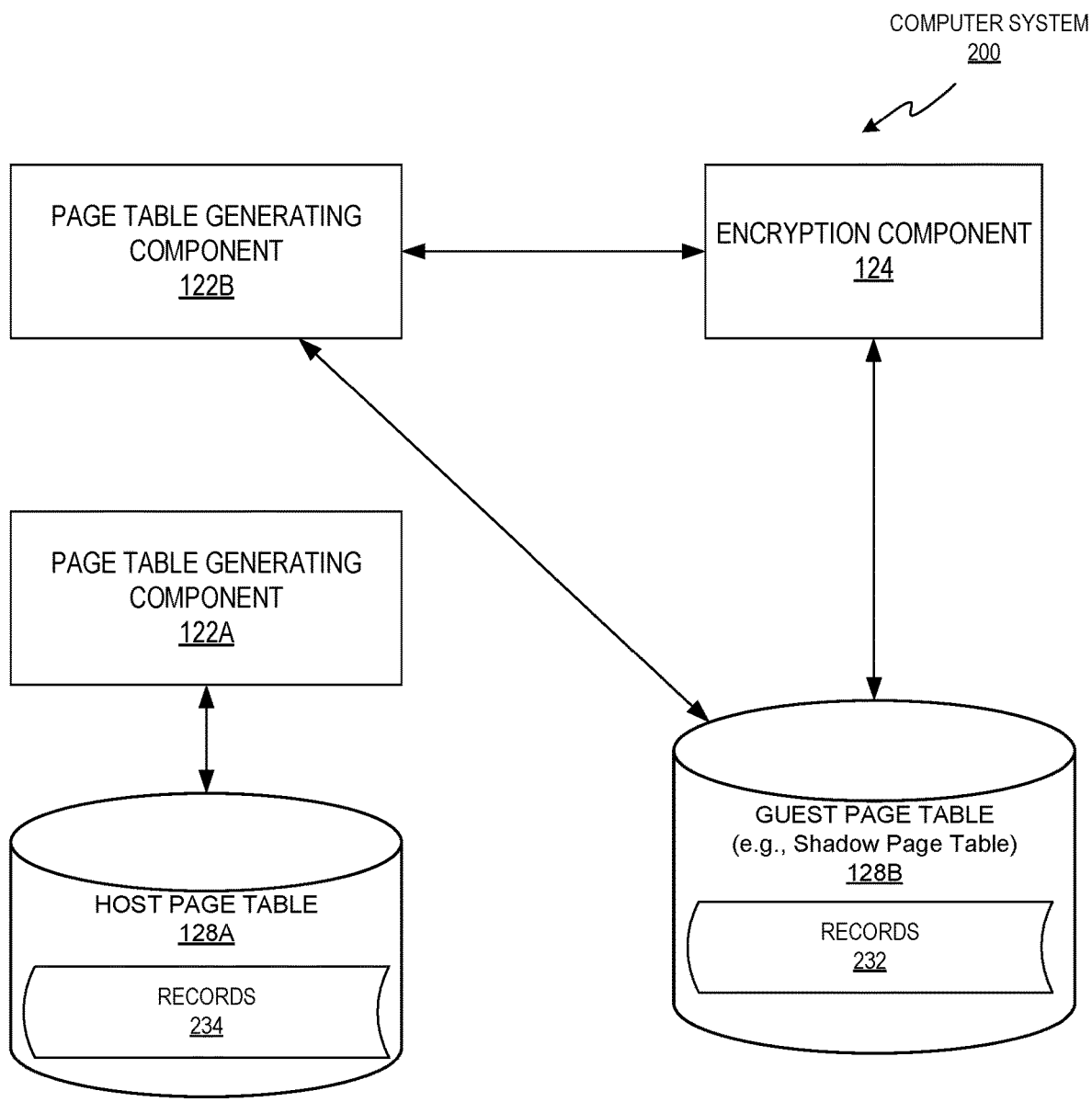
FIG. 2 depicts a block diagram illustrating components and modules of an example computer system, in accordance with one or more aspects of the present disclosure.

FIG. 2 is a block diagram illustrating example components and modules of computer system 200, in accordance with one or more aspects of the present disclosure. Computer system 200 may comprise executable code that implements one or more of the components and modules and may be implemented within a hypervisor, a host operating system, a guest operating system, hardware firmware, or a combination thereof. In the example shown, computer system 200 may include page table generating components 122A-B, encryption component 124, host page table 128A, and guest page table 128B.

Page table generating component 122B may enable computer system 200 to generate a guest page table 128B to enhance the security and performance of computer system 200. Page table 128B may include records 232, where each record within records 232 translates a Level 2 guest virtual address to a Level 1 guest physical address. Guest page table 128B may be generated in response to the Level 1 hypervisor detecting that it is running in an encrypted memory virtual machine. For example, the Level 1 virtual machine running the Level 1 hypervisor may be an encrypted memory virtual machine. The Level 1 hypervisor may detect that it is running in an encrypted virtual memory machine by detecting that a flag in each page table entry indicating that a corresponding page table of the virtual machine is encrypted. To generate guest page table 128B, the page table generating component 122B may first generate a Level 1 page table that translates Level 2 physical addresses of the Level 2 virtual machine to Level 1 physical addresses of the Level 1 hypervisor. The Level 1 page table may be generated in encrypted memory. Generating the Level 1 page table in encrypted memory makes the Level 1 page table inaccessible to a Level 0 hypervisor (e.g., hypervisor 120A).

Page table generating component 122B may then analyze a Level 2 page table of a Level 2 virtual machine. In an example, the Level 2 page table translates Level 2 guest virtual memory to Level 2 guest physical memory. Page table generating component 122B may then combine the Level 1 page table and the Level 2 page table to generate guest page table 128B. Page table 128B may also be stored in encrypted memory. Guest page table 128B may be a shadow page table having compressed translations. Specifically, guest page table 128B may translate Level 2 guest virtual addresses to Level 1 guest physical addresses using translation table. Accordingly, the Level 1 hypervisor (e.g., hypervisor 120B) may direct a vCPU to guest page table 128B for memory page mappings during a first level translation (e.g., translate Level 2 guest virtual addresses to Level 1 guest physical addresses) and cause the vCPU to use guest page table 128B for address translation.

Figure 3:
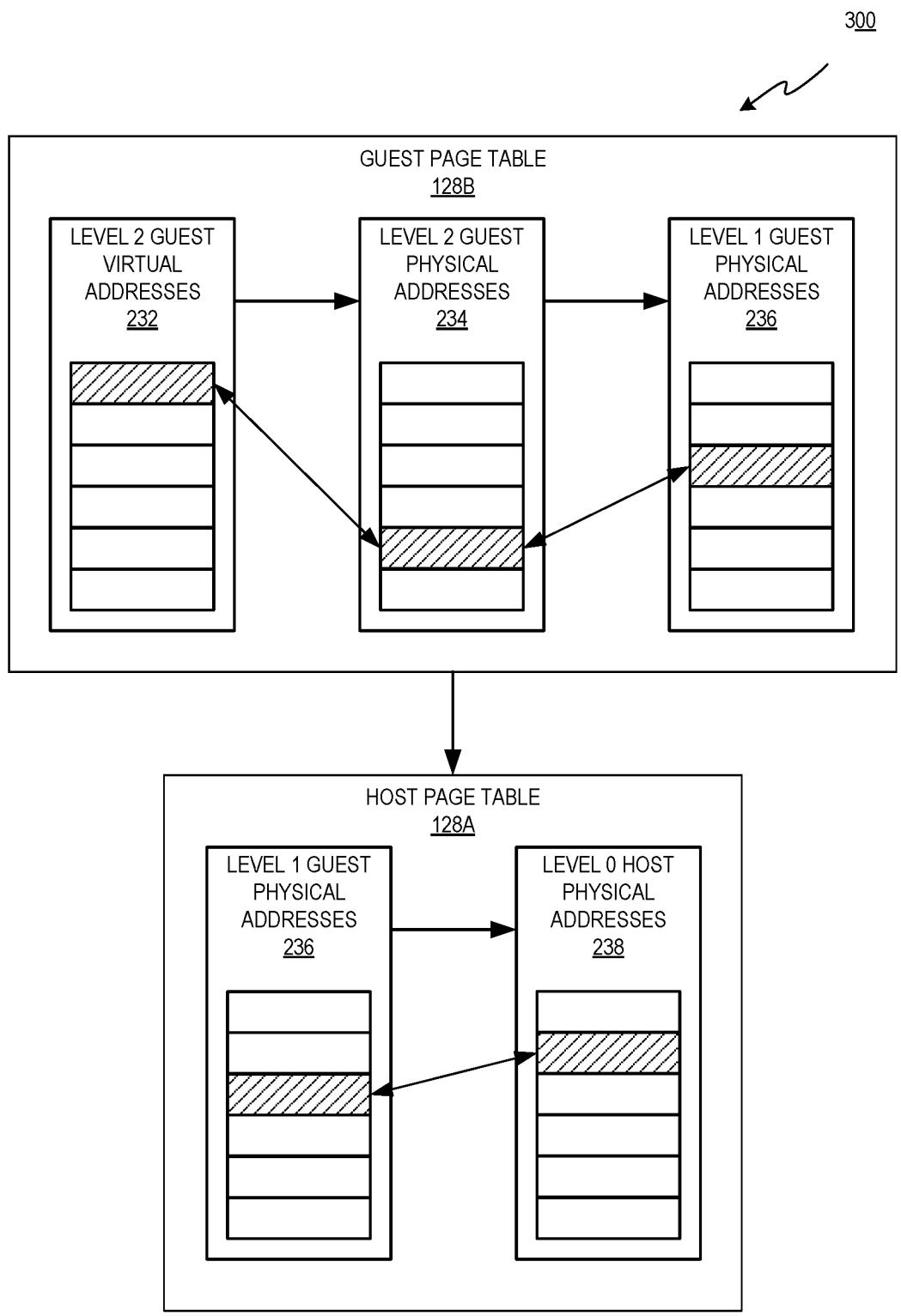
FIG. 3 depicts a block diagram illustrating an example memory translation, in accordance with one or more aspects of the present disclosure.

To perform a second level translation (e.g., translate Level 1 guest physical addresses to Level 0 host physical addresses), page table generating component 122A may generate host page table 128A. Page table 128B may include records 234, where each record within records 234 translates Level 1 guest physical addresses to Level 0 host physical addresses using a translation table. The Level 0 hypervisor (e.g., hypervisor 120A) may direct a host CPU to host page table 128A, and cause the host CPU to use host page table 128A for address translation. As described above, host page table 128A may be an EPT (extended page table) generated by page table generating component 122A, where Level 1 guest physical addresses are mapped to Level 0 host physical addresses. Thus, by way of page tables 128A-B, the computer system may translate Level 2 guest virtual addresses to Level 0 host physical addresses. This can be seen in FIG. 3, which is block diagram showing translations performed in guest page table 128B, and host page table 128A. Specifically, FIG. 3 shows guest page table 128B having Level 2 guest virtual addresses 232 mapped to Level 2 guest physical addresses 234, which are in turn mapped to Level 1 guest physical addresses 236. FIG. 3 further shows host page table 128A having Level 1 guest physical addresses 236 mapped to Level 0 host physical addresses 238. Accordingly, guest page table 128A-B can be used to translate Level 2 guest virtual addresses to Level 0 host physical addresses.

By way of illustrative example, an application running on a guest operating system (e.g., guest operating system 112A) of a Level 2 virtual machine (e.g., virtual machine 110A) may request to access data on a memory page(s). In response, a vCPU scheduler may schedule the request for execution on a vCPU. A Level 1 hypervisor (e.g., hypervisor 120B) may direct the vCPU to its shadow page table (e.g., guest page table 128B) for memory page mappings during a first level translation and cause the vCPU to use the shadow page table to translate Level 2 guest virtual addresses to Level 1 guest physical addresses. The Level 0 hypervisor (e.g., hypervisor 120A) may then direct a host CPU to its host page table (e.g., host page table 128A) for memory mappings during a second level translation and cause the host CPU to use host page table to translate Level 1 guest physical addresses to Level 0 host physical addresses.

Returning to FIG. 2, encryption component 124 may mark guest memory pages as encrypted or unencrypted in guest page table 128B. Encryption component 124 may mark one or guest physical addresses of one or more memory pages of the Level 2 guest memory as encrypted or unencrypted in guest page table 128B. In an example, each physical address in guest page table 128B may include an encryption bit (e.g., a C-bit) that indicates whether a guest memory page associated with that physical address is to be encrypted. When the encryption bit is set to 1, guest memory page(s) of the corresponding physical address may be stored in encrypted memory. When the encryption bit is set to 0, memory page(s) of the corresponding physical address may be in stored in unencrypted memory. The guest memory pages may be encrypted by an AES (Advanced Encryption Standard) engine.

In an example, the guest memory pages may be encrypted using Secure Memory Encryption (SME). Specifically, marked guest memory pages may be decrypted and encrypted during a read process or a write process. The guest memory pages may be encrypted using a key (e.g., a single 128-bit ephemeral AES key) which may be created randomly using a hardware random generator at each boot of the computer system. In another example, all of the guest memory pages may be encrypted using Transparent SME (TSME). In yet another example, the guest memory pages may be encrypted and decrypted using Secure Encrypted Virtualization (SEV).

It is noted that because guest memory pages are marked as encrypted in the Level 1 hypervisor (e.g., in guest page table 128B), unencrypted data from an Level 2 virtual machine (e.g., virtual machine 110A-C) cannot reach the Level 0 hypervisor (e.g., hypervisor 120A) because the data will be indicated as encrypted by the Level 1 hypervisor (e.g., hypervisor 120B). Thus, a malicious Level 2 virtual machine cannot have data reach the Level 0 hypervisor.

Encryption component 124 may also move guest memory pages from an encrypted memory portion to an unencrypted memory portion within the hypervisor memory 126B, and vice versa. In an example, all of the memory pages are stored in an encrypted memory portion by the Level 1 hypervisor, which means that the Level 0 hypervisor cannot receive any data from a Level 2 virtual machine. The Level 1 hypervisor may determine that the Level 2 virtual machine desires to transmit data to the Level 0 hypervisor. In response, encryption component 124 may copy certain guest memory pages from the encrypted memory portion to the unencrypted memory portion of the hypervisor memory 126B. As such, the memory pages become unencrypted and the Level 0 hypervisor can receive data associated with the memory pages in the unencrypted memory portion from the Level 2 virtual machine. In another example, if the Level 1 hypervisor has data to be sent to the Level 2 virtual machine and the data is stored in the unencrypted memory portion, the encryption component 124 may move the data from the unencrypted memory portion to the encrypted memory portion of the hypervisor memory 126B. The Level 1 hypervisor may then send the data to the Level 2 virtual machine.

Figure 4:
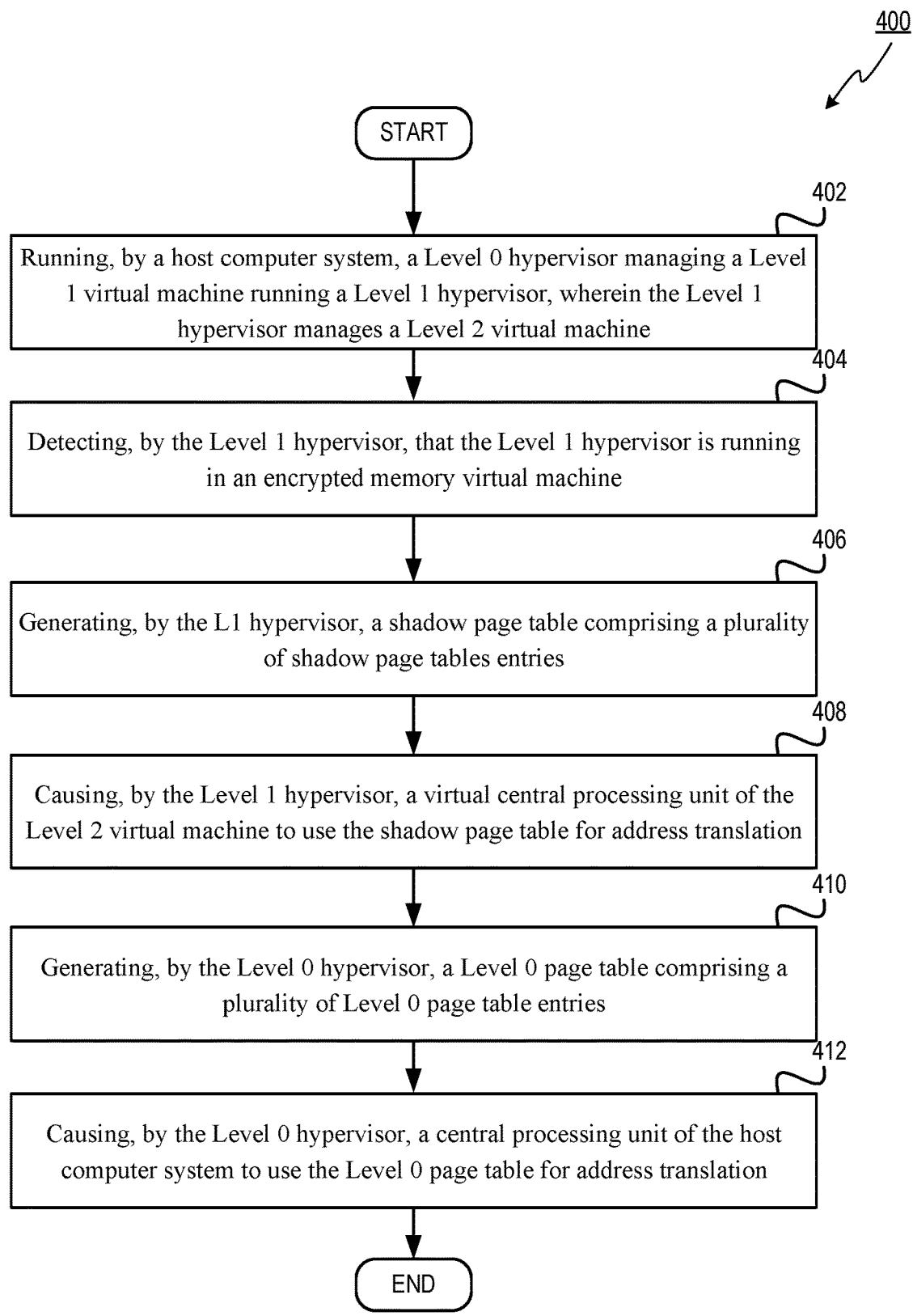
FIG. 4 depicts a flow diagram of an example method for hypervisor memory management, in accordance with one or more aspects of the present disclosure.

FIG. 4 depicts a flow diagram of an illustrative example of a method 400 for virtualized memory management, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by a kernel of a hypervisor as shown in FIG. 1 or by an executable code of a host machine (e.g., host operating system or firmware), a virtual machine (e.g., guest operating system or virtual firmware), other executable code, or a combination thereof.

Method 400 may be performed by processing devices of a server device or a client device and may begin at block 402. In block 402, a host computer system may run a Level 0 hypervisor that may manage a Level 1 virtual machine running a Level 1 hypervisor. The Level 1 hypervisor may manage a Level 2 virtual machine. Memory pages of the Level 2 virtual machine may be encrypted. At block 404, the Level 1 hypervisor may detect that it is running in an encrypted memory virtual machine. For example, the Level 1 hypervisor may detect that the Level 1 virtual machine is an encrypted memory virtual machine.

At block 406, the Level 1 hypervisor may generate a shadow page table comprising a plurality of shadow page table entries. Each shadow page table entry of the plurality of shadow page table entries may map a Level 2 guest virtual address of a Level 2 address space associated with the Level 2 virtual machine to a corresponding Level 1 guest physical address of a Level 1 address space associated with the Level 1 virtual machine. The shadow page table may be generated in an encrypted memory portion of the Level 1 hypervisor memory. Generating the shadow page table in the encrypted memory makes the shadow page table inaccessible to the Level 0 hypervisor.

At block 408, the Level 1 hypervisor may cause a virtual central processing unit (vCPU) of the Level 2 virtual machine to use the shadow page table for address translation. At block 410, the Level 0 hypervisor may generate a Level 0 page table comprising a plurality of Level 0 page table entries. Each Level 0 page table entry of the plurality of Level 0 page table entries may maps a Level 1 guest physical address to a corresponding Level 0 host physical address. At block 412, the Level 0 hypervisor may cause a central processing unit (CPU) of the host computer system to use the Level 0 page table for address translation.

Each Level 2 guest physical address of one or more memory pages of the Level 2 guest memory may be marked as encrypted or unencrypted in the shadow page table. In an example, each Level 2 guest physical address in the shadow page table includes an encryption bit that indicates whether a memory page associated with that Level 2 guest physical address is to be encrypted. When the encryption bit is set to 1, memory page(s) of the corresponding Level 2 guest physical address may be stored in encrypted memory. When the encryption bit is set to 0, memory page(s) of the corresponding Level 2 guest physical address may be in stored in unencrypted memory.

The Level 1 hypervisor may also move memory pages from an encrypted memory portion to an unencrypted memory portion within the L1 hypervisor memory, and vice versa. In an example, the Level 1 hypervisor may determine that the Level 2 virtual machine is to transmit data to the Level 0 hypervisor. In response, the Level 1 hypervisor may copy certain memory pages from the encrypted memory portion to the unencrypted memory portion of the Level 1 hypervisor memory. As such, the memory pages become unencrypted and the Level 0 hypervisor can receive data associated with the memory pages in the unencrypted memory portion from the Level 2 virtual machine. In another example, if the Level 1 hypervisor has data to be sent to the Level 2 virtual machine and the data is stored in the unencrypted memory portion, the Level 1 hypervisor may move the data from the unencrypted memory portion to the encrypted memory portion of the Level 1 hypervisor memory. The Level 1 hypervisor may then send the data to the Level 2 guest VM. Responsive to completing the operations described herein above with references to block 412, the method may terminate.

Figure 5:
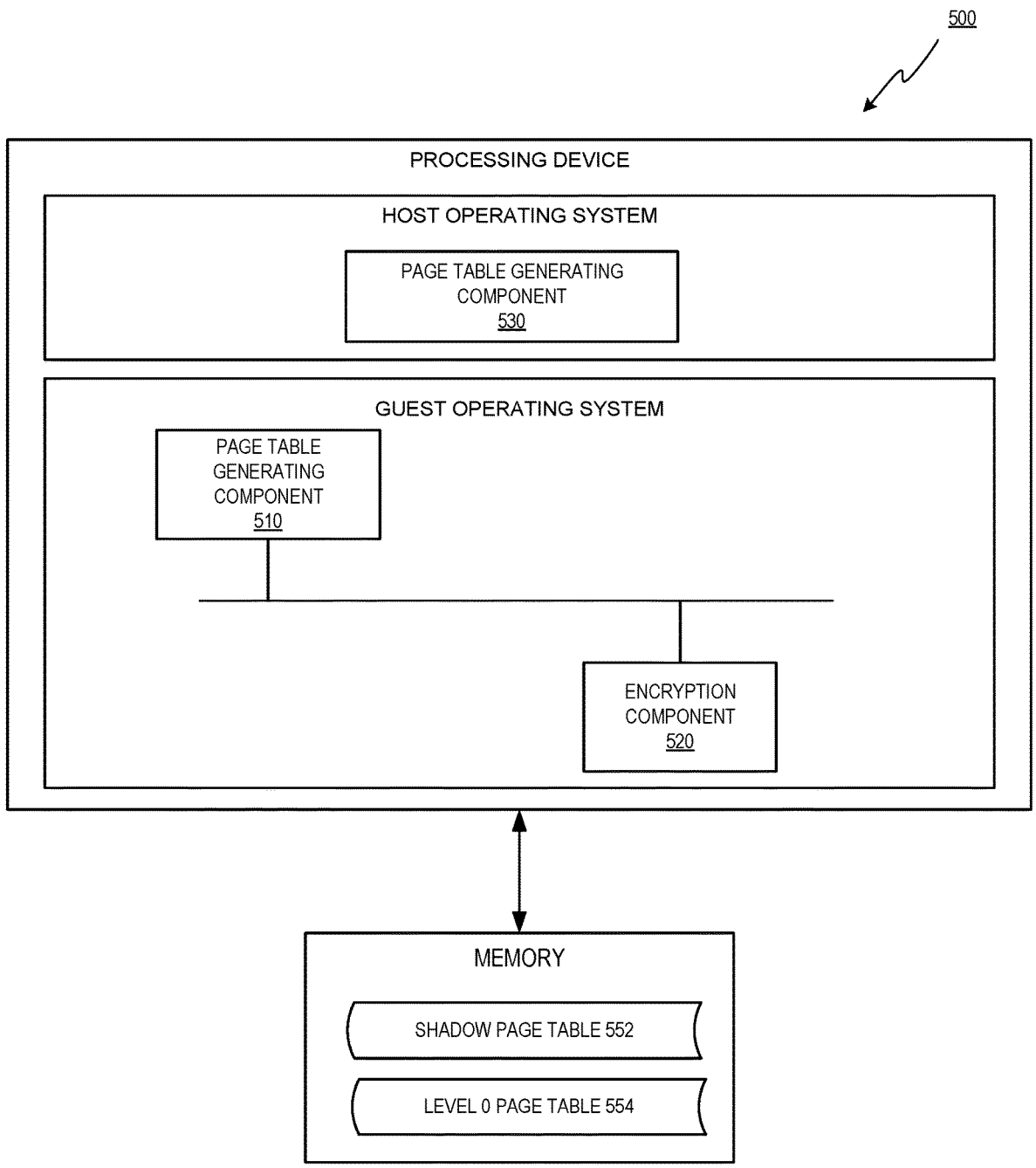
FIG. 5 depicts a block diagram of an example computer system in accordance with one or more aspects of the present disclosure.

FIG. 5 depicts a block diagram of a computer system 500 operating in accordance with one or more aspects of the present disclosure. Computer system 500 may be the same or similar to computer system 200 and computing device 100 and may include one or more processing devices and one or more memory devices. In the example shown, computer system 500 may include a guest page table generating component 510, encryption component 520, a page table generating component 530, a shadow page table 552, and a host page table 554.

The processing device may run a Level 0 hypervisor that may manage a Level 1 virtual machine running a Level 1 hypervisor. The Level 1 hypervisor may manage a Level 2 virtual machine. Memory pages of the Level 2 virtual machine may be encrypted. The Level 1 hypervisor may detect that it is running in an encrypted memory virtual machine (e.g., the Level 1 virtual machine is an encrypted memory virtual machine).

Page table generating component 510 may generate, by the Level 1 hypervisor, a shadow page table 552 comprising a plurality of shadow page table entries. Each shadow page table entry of the plurality of shadow page table entries may map a Level 2 guest virtual address of a Level 2 address space associated with the Level 2 virtual machine to a corresponding Level 1 guest physical address of a Level 1 address space associated with the Level 1 virtual machine. The shadow page table 552 may be generated in an encrypted memory portion of the Level 1 hypervisor memory. Generating the shadow page table 552 in the encrypted memory makes the shadow page table inaccessible to the Level 0 hypervisor. The Level 1 hypervisor may cause a virtual central processing unit (vCPU) of the Level 2 virtual machine to use the shadow page table 552 for address translation.

Page table generating component 530 may generate, by the Level 0 hypervisor, a Level 0 page table 554 comprising a plurality of Level 0 page table entries. Each Level 0 page table entry of the plurality of Level 0 page table entries may maps a Level 1 guest physical address to a corresponding Level 0 host physical address. The Level 0 hypervisor may cause a central processing unit (CPU) of the host computer system to use the Level 0 page table 554 for address translation.

Each Level 2 guest physical address of one or more memory pages of the Level 2 guest memory may be marked as encrypted or unencrypted in the shadow page table using encryption component 520. In an example, each Level 2 guest physical address in the shadow page table 552 includes an encryption bit that indicates whether a memory page associated with that Level 2 guest physical address is to be encrypted. When the encryption bit is set to 1, memory page(s) of the corresponding Level 2 guest physical address may be stored in encrypted memory. When the encryption bit is set to 0, memory page(s) of the corresponding Level 2 guest physical address may be in stored in unencrypted memory.

Encryption component 520 may also move memory pages from an encrypted memory portion to an unencrypted memory portion within the L1 hypervisor memory, and vice versa. In an example, the Level 1 hypervisor may determine that the Level 2 virtual machine is to transmit data to the Level 0 hypervisor. In response, the Level 1 hypervisor may copy certain memory pages from the encrypted memory portion to the unencrypted memory portion of the Level 1 hypervisor memory. As such, the memory pages become unencrypted and the Level 0 hypervisor can receive data associated with the memory pages in the unencrypted memory portion from the Level 2 virtual machine. In another example, if the Level 1 hypervisor has data to be sent to the Level 2 virtual machine and the data is stored in the unencrypted memory portion, the Level 1 hypervisor may move the data from the unencrypted memory portion to the encrypted memory portion of the Level 1 hypervisor memory. The Level 1 hypervisor may then send the data to the Level 2 virtual machine.

Figure 6:
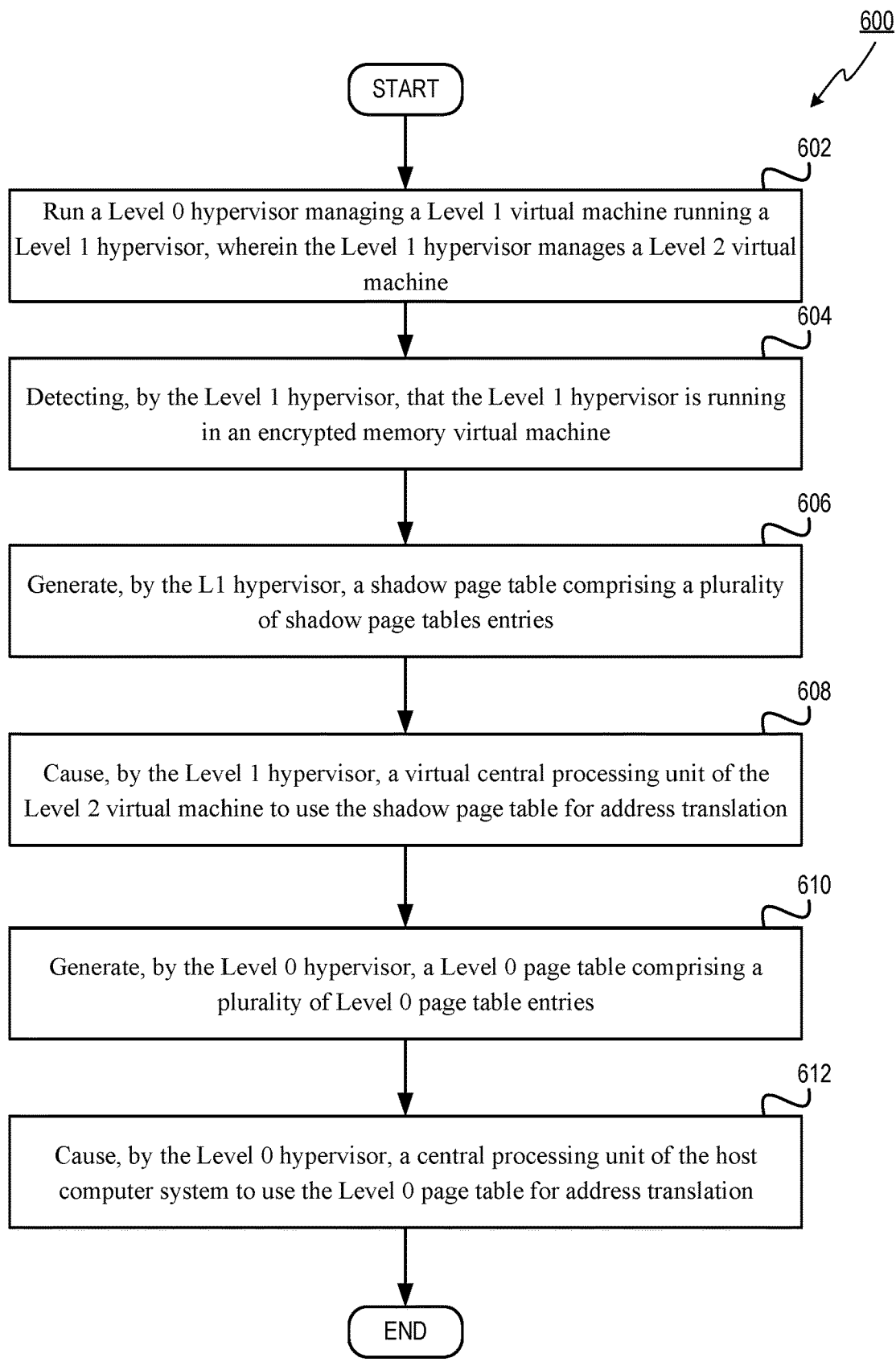
FIG. 6 depicts a flow diagram of an example method for hypervisor memory management for virtual machines, in accordance with one or more aspects of the present disclosure.

FIG. 6 depicts a flow diagram of one illustrative example of a method 600 for virtualized memory management, in accordance with one or more aspects of the present disclosure. Method 600 may be similar to method 400 and may be performed in the same or a similar manner as described above in regards to method 400. Method 600 may be performed by processing devices of a server device or a client device and may begin at block 602.

At block 602, the processing device may run a Level 0 hypervisor that may manage a Level 1 virtual machine running a Level 1 hypervisor. The Level 1 hypervisor may manage a Level 2 virtual machine. Memory pages of the Level 2 virtual machine may be encrypted. At block 604, the Level 1 hypervisor may detect that it is running in an encrypted memory virtual machine. For example, the Level 1 hypervisor may detect that the Level 1 virtual machine is an encrypted memory virtual machine.

At block 606, processing device may generate, by the Level 1 hypervisor, a shadow page table comprising a plurality of shadow page table entries. Each shadow page table entry of the plurality of shadow page table entries may map a Level 2 guest virtual address of a Level 2 address space associated with the Level 2 virtual machine to a corresponding Level 1 guest physical address of a Level 1 address space associated with the Level 1 virtual machine. The shadow page table may be generated in an encrypted memory portion of the Level 1 hypervisor memory. Generating the shadow page table in the encrypted memory makes the shadow page table inaccessible to the Level 0 hypervisor.

At block 608, the processing device may, by the Level 1 hypervisor, cause a virtual central processing unit (vCPU) of the Level 2 virtual machine to use the shadow page table for address translation. At block 610, the processing device may, by the Level 0 hypervisor, generate a Level 0 page table comprising a plurality of Level 0 page table entries. Each Level 0 page table entry of the plurality of Level 0 page table entries may maps a Level 1 guest physical address to a corresponding Level 0 host physical address. At block 612, the processing device may, by the Level 0 hypervisor, cause a central processing unit (CPU) of the host computer system to use the Level 0 page table for address translation.

Each Level 2 guest physical address of one or more memory pages of the Level 2 guest memory may be marked as encrypted or unencrypted in the shadow page table. In an example, each Level 2 guest physical address in the shadow page table includes an encryption bit that indicates whether a memory page associated with that Level 2 guest physical address is to be encrypted. When the encryption bit is set to 1, memory page(s) of the corresponding Level 2 guest physical address may be stored in encrypted memory. When the encryption bit is set to 0, memory page(s) of the corresponding Level 2 guest physical address may be in stored in unencrypted memory.

The Level 1 hypervisor may also move memory pages from an encrypted memory portion to an unencrypted memory portion within the L1 hypervisor memory, and vice versa. In an example, the Level 1 hypervisor may determine that the Level 2 virtual machine is to transmit data to the Level 0 hypervisor. In response, the Level 1 hypervisor may copy certain memory pages from the encrypted memory portion to the unencrypted memory portion of the Level 1 hypervisor memory. As such, the memory pages become unencrypted and the Level 0 hypervisor can receive data associated with the memory pages in the unencrypted memory portion from the Level 2 virtual machine. In another example, if the Level 1 hypervisor has data to be sent to the Level 2 virtual machine and the data is stored in the unencrypted memory portion, the Level 1 hypervisor may move the data from the unencrypted memory portion to the encrypted memory portion of the Level 1 hypervisor memory. The Level 1 hypervisor may then send the data to the Level 2 guest VM. Responsive to completing the operations described herein above with references to block 612, the method may terminate.

Figure 7:
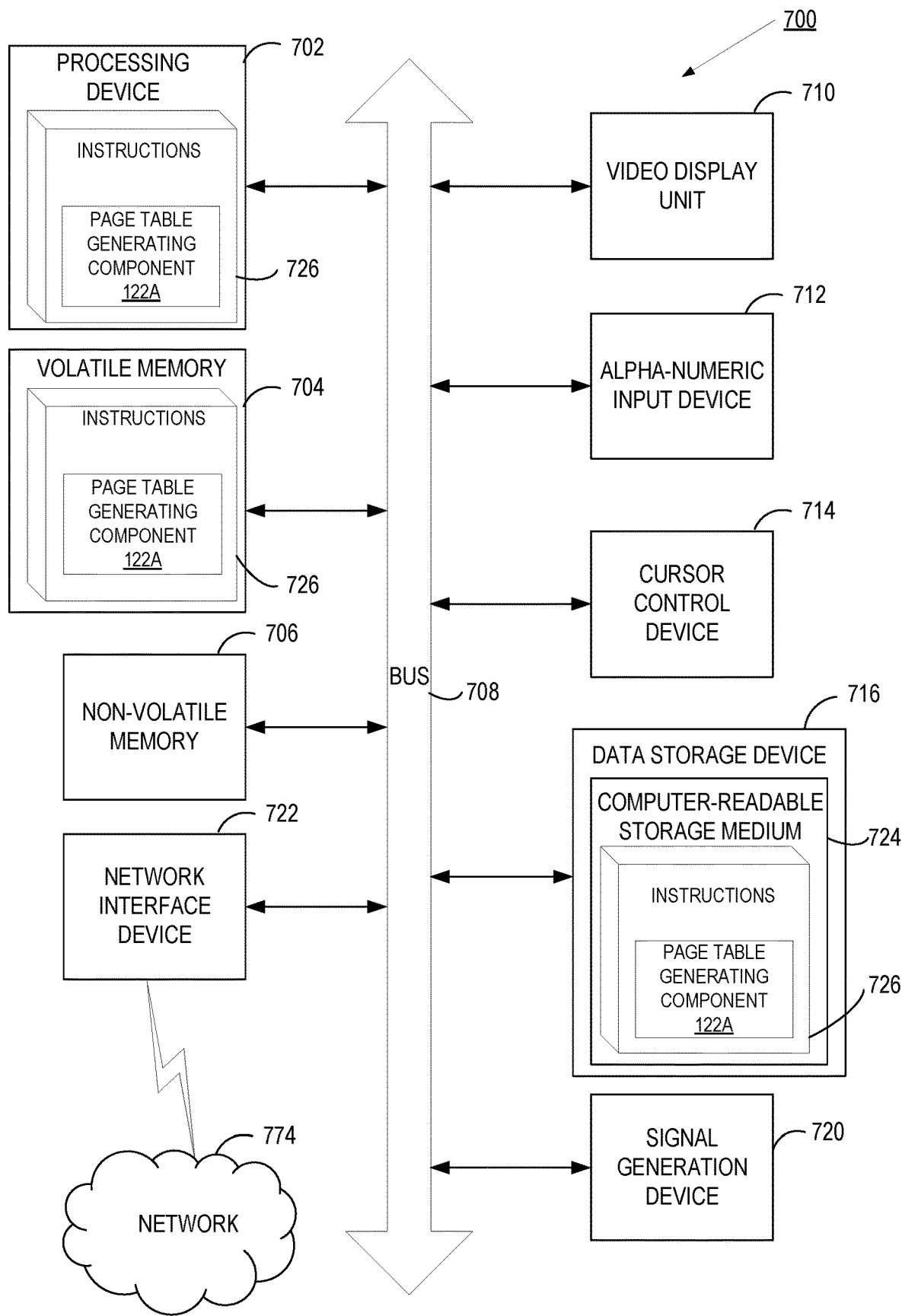
FIG. 7 depicts a block diagram of an illustrative computing device operating in accordance with the examples of the present disclosure.

FIG. 7 depicts a block diagram of a computer system operating in accordance with one or more aspects of the present disclosure. In various illustrative examples, computer system 700 may correspond to computing device 100 of FIG. 1 or computer system 200 of FIG. 2. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 600 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing methods 400 or 600 and for page table generating component 122, encryption component 124 (not shown), and modules illustrated in FIGS. 1 and 2.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400 or 600 and one or more of its individual functions, routines, subroutines, or operations.

Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
running, by a host computer system, a Level 0 hypervisor managing a Level 1 virtual machine running a Level 1 hypervisor, wherein the Level 1 hypervisor manages a Level 2 virtual machine, wherein a plurality of memory pages of the Level 2 virtual machine are encrypted;
detecting, by the Level 1 hypervisor, that the Level 1 hypervisor is running in an encrypted memory virtual machine;
generating, by the Level 1 hypervisor, a shadow page table comprising a plurality of shadow page table entries, wherein each shadow page table entry of the plurality of shadow page table entries maps a Level 2 guest virtual address of a Level 2 address space associated with the Level 2 virtual machine to a corresponding Level 1 guest physical address of a Level 1 address space associated with the Level 1 virtual machine;
causing, by the Level 1 hypervisor, a virtual central processing unit (vCPU) of the Level 2 virtual machine to use the shadow page table for address translation;
generating, by the Level 0 hypervisor, a Level 0 page table comprising a plurality of Level 0 page table entries, wherein each Level 0 page table entry of the plurality of Level 0 page table entries maps a Level 1 guest physical address to a corresponding Level 0 host physical address; and
causing, by the Level 0 hypervisor, a central processing unit (CPU) of the host computer system to use the Level 0 page table for address translation.

2. The method of claim 1, wherein the shadow page table is stored in an encrypted memory.

3. The method of claim 1, further comprising:
copying data from an encrypted memory portion to an unencrypted memory portion in response to the Level 2 virtual machine requesting to transmit data to the Level 0 hypervisor.

4. The method of claim 1, further comprising:
copying data from an unencrypted memory portion to an encrypted memory portion in response to the Level 1 hypervisor requesting to transmit data to the Level 2 virtual machine.

5. The method of claim 1, wherein the shadow page table is generated in view of a Level 2 virtual machine page table and a Level 1 hypervisor page table.

6. The method of claim 1, further comprising:
receiving a request from an application running on a guest operating system of the Level 2 virtual machine to access data on a memory page of the plurality of memory pages; and
scheduling the vCPU to use the shadow page table for address translation.

7. The method of claim 1, wherein Level 2 guest physical addresses of each of the plurality of memory pages comprise an encryption bit.

8. A system, comprising:
a memory;
a processing device operatively coupled to the memory, the processing device configured to:
run, by a host computer system, a Level 0 hypervisor managing a Level 1 virtual machine running a Level 1 hypervisor, wherein the Level 1 hypervisor manages a Level 2 virtual machine, wherein a plurality of memory pages of the Level 2 virtual machine are encrypted;
detect, by the Level 1 hypervisor, that the Level 1 hypervisor is running in an encrypted memory virtual machine;
generate, by the Level 1 hypervisor, a shadow page table comprising a plurality of shadow page table entries, wherein each shadow page table entry of the plurality of shadow page table entries maps a Level 2 guest virtual address of a Level 2 address space associated with the Level 2 virtual machine to a corresponding Level 1 guest physical address of a Level 1 address space associated with the Level 1 virtual machine;
cause, by the Level 1 hypervisor, a virtual central processing unit (vCPU) of the Level 2 virtual machine to use the shadow page table for address translation;
generate, by the Level 0 hypervisor, a Level 0 page table comprising a plurality of Level 0 page table entries, wherein each Level 0 page table entry of the plurality of Level 0 page table entries maps a Level 1 guest physical address to a corresponding Level 0 host physical address; and
cause, by the Level 0 hypervisor, a central processing unit (CPU) of the host computer system to use the Level 0 page table for address translation.

9. The system of claim 8, wherein the shadow page table is generated in encrypted memory.

10. The system of claim 8, further comprising the processing device configured to:
copy data from an encrypted memory portion to an unencrypted memory portion in response to the Level 2 virtual machine requesting to transmit data to the Level 0 hypervisor.

11. The system of claim 8, further comprising the processing device configured to:
copy data from an unencrypted memory portion to an encrypted memory portion in response to the Level 1 hypervisor requesting to transmit data to the Level 2 virtual machine.

12. The system of claim 8, wherein the shadow page table is generated in view of a Level 2 virtual machine page table and a Level 1 hypervisor page table.

13. The system of claim 8, further comprising the processing device configured to:
receiving a request from an application running on a guest operating system of the Level 2 virtual machine to access data on a memory page of the plurality of memory pages; and
scheduling the vCPU to use the shadow page table for address translation.

14. The system of claim 8, wherein Level 2 guest physical addresses of each of the plurality of memory pages comprise an encryption bit.

15. A non-transitory machine-readable storage medium storing instructions that cause a processing device to:
run, by a host computer system, a Level 0 hypervisor managing a Level 1 virtual machine running a Level 1 hypervisor, wherein the Level 1 hypervisor manages a Level 2 virtual machine, wherein a plurality of memory pages of the Level 2 virtual machine are encrypted;

detect, by the Level 1 hypervisor, that the Level 1 hypervisor is running in an encrypted memory virtual machine;

generate, by the Level 1 hypervisor, a shadow page table comprising a plurality of shadow page table entries, wherein each shadow page table entry of the plurality of shadow page table entries maps a Level 2 guest virtual address of a Level 2 address space associated with the Level 2 virtual machine to a corresponding Level 1 guest physical address of a Level 1 address space associated with the Level 1 virtual machine;

cause, by the Level 1 hypervisor, a virtual central processing unit (vCPU) of the Level 2 virtual machine to use the shadow page table for address translation;

generate, by the Level 0 hypervisor, a Level 0 page table comprising a plurality of Level 0 page table entries, wherein each Level 0 page table entry of the plurality of Level 0 page table entries maps a Level 1 guest physical address to a corresponding Level 0 host physical address; and cause, by the Level 0 hypervisor, a central processing unit (CPU) of the host computer system to use the Level 0 page table for address translation.

16. The non-transitory machine-readable storage medium of claim 15, wherein the shadow page table is generated in encrypted memory.

17. The non-transitory machine-readable storage medium of claim 15, further comprising the processing device configured to:
copy data from an encrypted memory portion to an unencrypted memory portion in response to the Level 2 virtual machine requesting to transmit data to the Level 0 hypervisor.

18. The non-transitory machine-readable storage medium of claim 15, further comprising the processing device configured to:
copy data from an unencrypted memory portion to an encrypted memory portion in response to the Level 1 hypervisor requesting to transmit data to the Level 2 virtual machine.

19. The non-transitory machine-readable storage medium of claim 15, wherein the shadow page table is generated in view of a Level 2 virtual machine page table and a Level 1 hypervisor page table.

20. The non-transitory machine-readable storage medium of claim 15, wherein Level 2 guest physical addresses of each of the plurality of memory pages comprise an encryption bit.

* * * * *